(12) United States Patent
Liao et al.

(10) Patent No.: US 11,732,131 B2
(45) Date of Patent: Aug. 22, 2023

(54) THERMOPLASTIC POLYURETHANE RESIN SUITABLE FOR MELT SPINNING

(71) Applicant: NAN YA PLASTICS CORPORATION, Taipei (TW)

(72) Inventors: Te-Chao Liao, Taipei (TW); Han-Ching Hsu, Taipei (TW); Chen-Wei Chang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 17/885,517

(22) Filed: Aug. 10, 2022

(65) Prior Publication Data

US 2023/0121054 A1 Apr. 20, 2023

(51) Int. Cl.

| | | |
|---|---|---|
| *C08L 75/06* | (2006.01) | |
| *D01D 5/08* | (2006.01) | |
| *C08G 18/42* | (2006.01) | |
| *C08G 18/12* | (2006.01) | |
| *C08G 18/28* | (2006.01) | |
| *D01F 6/70* | (2006.01) | |
| *C08G 18/76* | (2006.01) | |
| *D01D 1/04* | (2006.01) | |
| *C08K 5/3492* | (2006.01) | |
| *C08G 18/08* | (2006.01) | |
| *D01F 1/10* | (2006.01) | |

(52) U.S. Cl.
CPC .......... *C08L 75/06* (2013.01); *C08G 18/0895* (2013.01); *C08G 18/12* (2013.01); *C08G 18/2825* (2013.01); *C08G 18/4202* (2013.01); *C08G 18/4236* (2013.01); *C08G 18/4238* (2013.01); *C08G 18/7671* (2013.01); *C08K 5/3492* (2013.01); *D01D 1/04* (2013.01); *D01D 5/08* (2013.01); *D01F 6/70* (2013.01); *D01F 1/10* (2013.01)

(58) Field of Classification Search
CPC ..... C08L 75/06; C08G 18/4236; C08G 18/12; C08G 18/2825; C08G 18/4202; C08G 18/4238; C08G 18/0895; C08G 18/7671; D01D 5/08; D01D 1/04; C08K 5/3492; D01F 1/10; D01F 6/70

See application file for complete search history.

(56) References Cited

U.S. PATENT DOCUMENTS 5,391,682 A 2/1995 Ogawa et al.

FOREIGN PATENT DOCUMENTS

| CN | 1693549 A | 11/2005 |
|---|---|---|
| WO | WO2019118604 A1 | 6/2019 |

OTHER PUBLICATIONS

Kasprzyk et al.; Investigation of Thermoplastic Polyurethanes Synthesized via Two Different Prepolymers; Journal of Polymers and the Environment (2019) 27:2588-2599; Aug. 26, 2019. (Year: 2019).*

* cited by examiner

*Primary Examiner* — Rabon A Sergent
(74) *Attorney, Agent, or Firm* — Li & Cai Intellectual Property Office

(57) ABSTRACT

A thermoplastic polyurethane resin suitable for melt spinning is formed from a reaction mixture via a polymerization reaction. The reaction mixture includes an isocyanate component and a polyol component. The polyol component includes a first polyol that has a first number average molecular weight and a second polyol that has a second number average molecular weight. The first number average molecular weight is between 1,000 g/mol and 1,500 g/mol, and the second number average molecular weight is between 2,500 g/mol and 3,000 g/mol. One resin component formed by the first polyol via the polymerization reaction is defined as a low melting point segment and correspondingly has a first melting point between 170° C. and 185° C. Another resin component formed by the second polyol via the polymerization reaction is defined as a high melting point segment and correspondingly has a second melting point between 195° C. and 210° C.

11 Claims, 2 Drawing Sheets

THERMOPLASTIC POLYURETHANE RESIN SUITABLE FOR MELT SPINNING

CROSS-REFERENCE TO RELATED PATENT APPLICATION

This application claims the benefit of priority to Taiwan Patent Application No. 110138278, filed on Oct. 15, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a thermoplastic polyurethane resin, and more particularly to a thermoplastic polyurethane resin suitable for melt spinning.

BACKGROUND OF THE DISCLOSURE

A thermoplastic polyurethane (TPU) resin is an environment-friendly polymer. The thermoplastic polyurethane resin can be made into a spinning product through a melt spinning process.

However, in the related art, infusible small crystals or coarse particles are inevitably formed during a process of producing thermoplastic polyurethane resin pellets.

As a result, in the process of melt-spinning the conventional thermoplastic polyurethane resin into the spinning product, a phenomenon of filament breakage can easily occur due to the small crystals or coarse particles.

When being used for producing fine denier, the conventional thermoplastic polyurethane resin is likely to have problems such as yarn floating and winding difficulties during the melt spinning process.

Furthermore, during the melt spinning process of the conventional thermoplastic polyurethane resin, a melt flow index (MFI) has a large variation, which easily causes the spinning product to have an uneven thickness, thereby affecting physical properties of the spinning product.

SUMMARY OF THE DISCLOSURE

In response to the above-referenced technical inadequacies, the present disclosure provides a thermoplastic polyurethane resin suitable for melt spinning.

In one aspect, the present disclosure provides a thermoplastic polyurethane resin suitable for melt spinning, which is formed from a reaction mixture via a polymerization reaction. The reaction mixture includes an isocyanate component and a polyol component. The polyol component includes a first polyol and a second polyol. The first polyol has a first number average molecular weight, the second polyol has a second number average molecular weight, the first number average molecular weight is between 1,000 and 1,500 g/mol, and the second number average molecular weight is between 2,500 and 3,000 g/mol. In the thermoplastic polyurethane resin, a resin component formed by the first polyol and the isocyanate component through the polymerization reaction is defined as a low melting point segment and correspondingly has a first melting point, and another resin component formed by the second polyol and the isocyanate component through the polymerization reaction is defined as a high melting point segment and correspondingly has a second melting point. The first melting point is between 170° C. and 185° C., the second melting point is between 195° C. and 210° C., and a difference between the first melting point and the second melting point is not less than 15° C. The low melting point segment has a percentage of heat of fusion ranging from 20% to 45%, and the high melting point segment has a percentage of heat of fusion ranging from 55% to 80%.

In certain embodiments, the first melting point is between 175° C. and 180° C., the second melting point is between 200° C. and 205° C., and the difference between the first melting point and the second melting point is not less than 20° C.

In certain embodiments, in the thermoplastic polyurethane resin, the percentage of heat of fusion of the low melting point segment is between 30% and 40%, and the percentage of heat of fusion of the high melting point segment is between 60% and 70%.

In certain embodiments, the first polyol is a first polyester polyol and is at least one material selected from the group consisting of: poly(1,4-butylene adipate), polyethylene-1,4-butylene adipate glycol, and poly(1,6-hexamethylene adipate-succinic acid). The second polyol is a second polyester polyol and is at least one material selected from the group consisting of: poly(1,4-butylene adipate), polyethylene-1,4-butylene adipate glycol, and poly(1,6-hexamethylene adipate-succinic acid).

In certain embodiments, when the thermoplastic polyurethane resin is melt-spun, the low melting point segment will melt and soften first, and the low melting point segment will further assist the high melting point segment to further melt and soften. The low melting point segment is capable of reducing a heat of fusion of the thermoplastic polyurethane resin, and the heat of fusion of the thermoplastic polyurethane resin is between 15 joules/gram and 25 joules/gram.

In certain embodiments, the reaction mixture further includes a chain terminator component, and the chain terminator component is a monohydric alcohol having a boiling point between 210° C. and 344° C.

In certain embodiments, the thermoplastic polyurethane resin is additionally added with an ultraviolet absorber, and the ultraviolet absorber is at least one material selected from the group consisting of benzotriazoles, benzophenones, and triazines.

In certain embodiments, a melt index (MI) of the thermoplastic polyurethane resin is between 10 and 25 g/10 min (215° C.), and a ratio (Mw/Mn) between a weight average molecular weight (Mw) and a number average molecular weight (Mn) of the thermoplastic polyurethane resin analyzed by a gel permeation chromatograph (GPC) is between 1.450 and 1.550.

In certain embodiments, based on a total weight of the reaction mixture being 100 parts by weight, an amount of the isocyanate component is between 45 and 50 parts by weight, and an amount of the polyol component is between 35 and 40 parts by weight. A weight ratio between the first polyol and the second polyol ranges from 12:24 to 8:26.

In another aspect, the present disclosure provides a thermoplastic polyurethane resin suitable for melt spinning A polymer chain of the thermoplastic polyurethane resin includes at least a low melting point segment and at least a high melting point segment. The low melting point segment is formed by a first polyol and an isocyanate component through a polymerization reaction, and the high melting point segment is formed by a second polyol and the isocyanate component through the polymerization reaction. The first polyol has a first number average molecular weight, the second polyol has a second number average molecular weight, the first number average molecular weight is between 1,000 and 1,500 g/mol, and the second number average molecular weight is between 2,500 and 3,000 g/mol. The low melting point segment correspondingly has a first melting point, the high melting point segment correspondingly has a second melting point, the first melting point is between 170° C. and 185° C., the second melting point is between 195° C. and 210° C., and a difference between the first melting point and the second melting point is not less than 15° C. A percentage of heat of fusion of the low melting point segment is between 20% and 45%, and a percentage of heat of fusion of the high melting point segment is between 55% and 80%.

In certain embodiments, in the thermoplastic polyurethane resin, the percentage of heat of fusion of the low melting point segment is between 30% and 40%, and the percentage of heat of fusion of the high melting point segment is between 60% and 70%.

Therefore, in the thermoplastic polyurethane resin provided by the present disclosure, by virtue of "the polyol component includes a first polyol and a second polyol, the first polyol has a first number average molecular weight, the second polyol has a second number average molecular weight, the first number average molecular weight is between 1,000 g/mol and 1,500 g/mol, and the second number average molecular weight is between 2,500 g/mol and 3,000 g/mol," "in the thermoplastic polyurethane resin, one resin component formed by the first polyol and the isocyanate component through the polymerization reaction is defined as a low melting point segment and correspondingly has a first melting point, another resin component formed by the second polyol and the isocyanate component through the polymerization reaction is defined as a high melting point segment and correspondingly has a second melting point, the first melting point is between 170° C. and 185° C., the second melting point is between 195° C. and 210° C., and a difference between the first melting point and the second melting point is not less than 15° C.," and "the low melting point segment has a percentage of heat of fusion ranging from 20% to 45%, and the high melting point segment has a percentage of heat of fusion ranging from 55% to 80%," a machine processing temperature required for the thermoplastic polyurethane resin (TPU resin) in a spinning operation can be reduced.

Furthermore, a spinning product formed by the thermoplastic polyurethane resin of the present disclosure through the spinning operation can be easily cooled down and shaped, and is easy to be wound. A low processing temperature can prevent the thermoplastic polyurethane resin from excessive melting and prevent a viscosity thereof from becoming too low. Accordingly, problems such as filament breakage, yarn floating, and uneven thickness can be improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
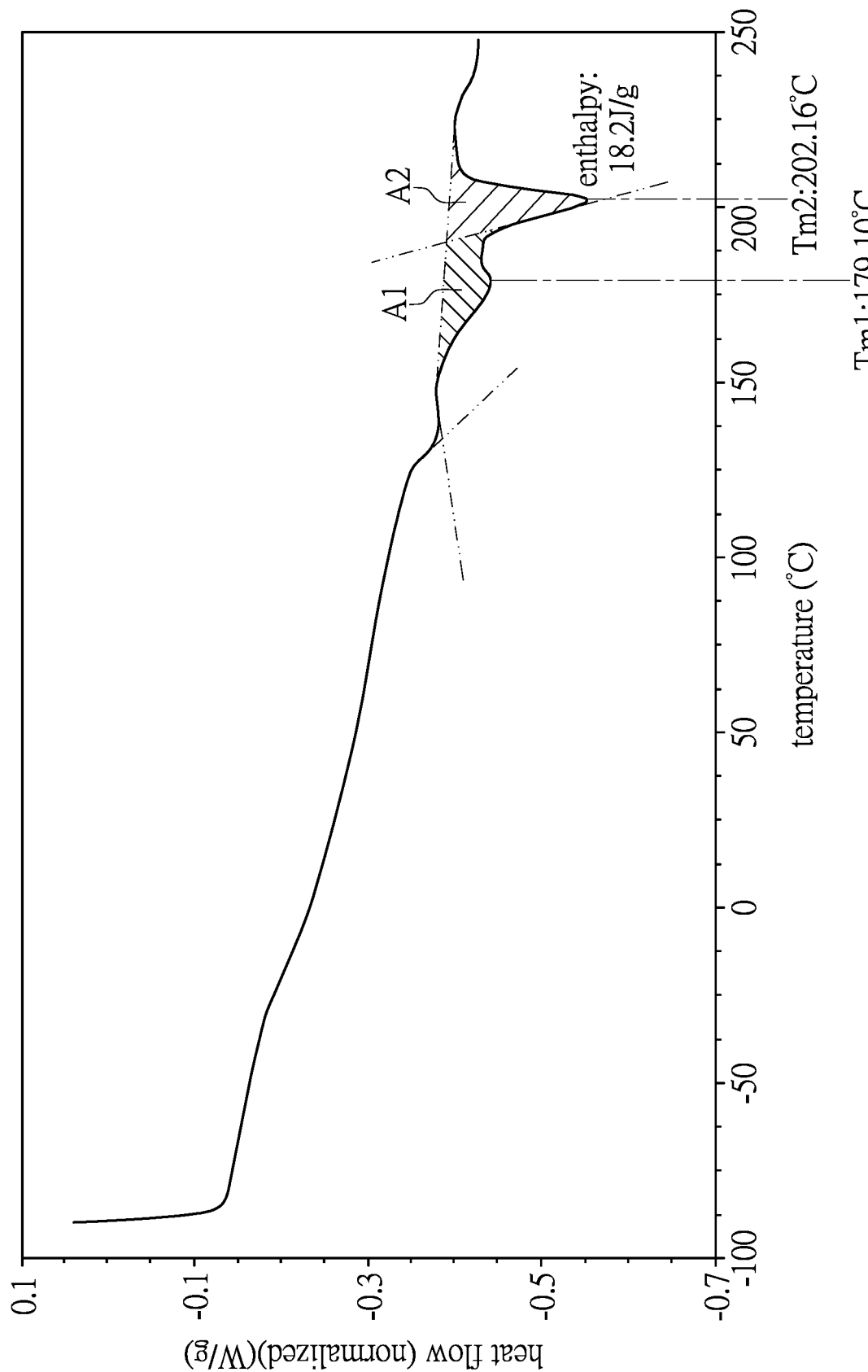
FIG. 1 is a test result of differential scanning calorimetry (DSC) of a thermoplastic polyurethane resin according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Thermoplastic Polyurethane Resin

A thermoplastic polyurethane resin can be made into a spinning product through a melt spinning process. However, in the related art, infusible small crystals or coarse particles are inevitably formed during a process of producing thermoplastic polyurethane resin pellets. As a result, in the process of melt-spinning the conventional thermoplastic polyurethane resin into the spinning product, a phenomenon of filament breakage can easily occur due to the small crystals or coarse particles. When being used for producing fine denier, the conventional thermoplastic polyurethane resin is likely to have problems such as yarn floating and winding difficulties during the melt spinning process. Furthermore, during the melt spinning process of the conventional thermoplastic polyurethane resin, a melt flow index (MFI) has a large variation, which easily causes the spinning product to have an uneven thickness, thereby affecting physical properties of the spinning product.

In order to solve the above-mentioned technical inadequacies present in the related art, an embodiment of the present disclosure provides a thermoplastic polyurethane resin (TPU resin), and more particularly provides a thermoplastic polyurethane resin suitable for melt spinning.

When the thermoplastic polyurethane resin of the present embodiment is formed into the spinning product by melt spinning, the problems (such as filament breakage, yarn floating, and difficulty in winding) during the melt spinning process can be effectively improved. Furthermore, since the melt flow index of the thermoplastic polyurethane resin of the present embodiment has a small variation during the melt spinning process, a thickness uniformity of the spinning product can also be effectively improved, such that the product has good physical properties.

In order to achieve the technical purpose illustrated above, the thermoplastic polyurethane resin of the present embodiment includes two or more polyester polyols. The thermoplastic polyurethane resin can have two melting points through the design of different molecular structures and molecular weights. The thermoplastic polyurethane resin is suitable for melt spinning and has good extensibility and winding properties.

More specifically, the thermoplastic polyurethane resin of the present embodiment is formed by a reaction mixture through a polymerization reaction. The reaction mixture includes: an isocyanate component, a polyol component, and a chain terminator component.

Based on a total weight of the reaction mixture being 100 parts by weight, an amount of the isocyanate component is between 45 parts by weight and 50 parts by weight, an amount of the polyol component is between 35 parts by weight and 40 parts by weight, and an amount of the chain terminator component is between 0.1 parts by weight and 0.5 parts by weight.

It should be noted that, in the present embodiment, the reaction mixture may selectively include a chain extender component or other auxiliary additive components, but the present disclosure is not limited thereto.

Further, the isocyanate component is at least one material selected from the group consisting of methylene diphenyl di-isocyanate (MDI), 4,4'-methylene di-cyclohexyl di-isocyanate (H12MDI), and isophorone di-isocyanate (IPDI). The material types of the above-mentioned isocyanate are provided for illustrative purposes only, and the present disclosure is not limited thereto.

The polyol component includes: a first polyol and a second polyol. The first polyol and the second polyol are respectively a first polyester polyol and a second polyester polyol. A weight ratio between the first polyol and the second polyol ranges from 12:24 to 8:26.

In some embodiments of the present disclosure, the first polyester polyol is at least one material selected from the group consisting of: poly(1,4-butylene adipate), polyethylene-1,4-butylene adipate glycol, and poly(1,6-hexamethylene adipate-succinic acid). Similarly, the second polyester polyol is at least one material selected from the group consisting of: poly(1,4-butylene adipate), polyethylene-1,4-butylene adipate glycol, and poly(1,6-hexamethylene adipate-succinic acid). The material types of the above polyols are provided for illustrative purposes only, and the present disclosure is not limited thereto.

The material types of the first polyol and the second polyol may be the same or different from one another (not limited in the present disclosure). The main difference between the first polyol and the second polyol is that the number average molecular weights (Mn) of these two polyols fall in different numerical ranges.

It is worth mentioning that the poly(1,4-butylene adipate) (PBA) is formed by polymerization of adipic acid and 1,4-butanediol. The polyethylene-1,4-butylene adipate glycol is formed by polymerization of adipic acid, ethylene glycol, and 1,4-butanediol. The poly(1,6-hexamethylene adipate-succinic acid) is formed by polymerization of adipic acid, succinic acid, and hexanediol.

Further, the first polyol has a first number average molecular weight, the second polyol has a second number average molecular weight, and the first number average molecular weight is less than the second number average molecular weight. The first number average molecular weight of the first polyol is between 1,000 g/mol (grams per mole) and 1,500 g/mol, the second number average molecular weight of the second polyol is between 2,500 g/mol and 3,000 g/mol, and a difference between the first number average molecular weight and the second number average molecular weight is not less than 1,000 g/mol.

Reference is made to FIG. 1, which illustrates a test result of differential scanning calorimetry (DSC) of the thermoplastic polyurethane resin according to the present embodiment. The test result shows that the thermoplastic polyurethane resin of the present embodiment has a first melting point (Tm1) and a second melting point (Tm2) The first melting point (Tm1) is approximately between 170° C. and 185° C., and is preferably between 175° C. and 180° C. The second melting point (Tm2) is approximately between 195° C. and 210° C., and is preferably between 200° C. and 205° C. Specifically, Tm1 is 179.1° C., and Tm2 is 202.16° C. Furthermore, a difference between the first melting point and the second melting point is not less than 15° C., and is preferably not less than 20° C.

In the thermoplastic polyurethane resin, a resin component formed by the first polyol via the polymerization reaction correspondingly has the first melting point (low melting point), and another resin component formed by the second polyol via the polymerization reaction correspondingly has the second melting point (high melting point). In addition, the resin component having the first melting point accounts for 20% to 45% (preferably 30% to 40%) of the whole thermoplastic polyurethane resin. The resin component having the second melting point accounts for 55% to 80% (preferably 60% to 70%) of the whole thermoplastic polyurethane resin.

It should be noted that the above-mentioned unit of "%" is a percentage of heat of fusion. More specifically, the percentage of heat of fusion is a ratio of the heat of fusion of a DSC melting curve obtained by measuring a melting peak area ($\Delta$Hm) of the thermoplastic polyurethane resin by differential scanning calorimetry (DSC), and the ratio is expressed as a percentage. For example, as shown in FIG. 1, the resin component (low melting point segment) having the first melting point Tm1 corresponds to a first melting peak area A1. The resin component (high melting point segment) having the second melting point Tm2 corresponds to a second melting peak area A2. A calculation formula of the percentage of heat of fusion of the resin component (low melting point segment) having the first melting point Tm1 is: A1/(A1+A2). A calculation formula of the percentage of heat of fusion of the resin component (high melting point segment) having the second melting point Tm2 is: A2/(A1+A2).

It is worth mentioning that the thermoplastic polyurethane resin of the present embodiment can be made into a colloidal product and is suitable for the process of melt spinning. The resin component having the first melting point (low melting point) can be used to reduce a machine processing temperature required for a spinning operation in the melt spinning process. Conventionally, the machine processing temperature required for the spinning operation is approximately between 230° C. and 240° C. In the present embodiment, the machine processing temperature required for the spinning operation can be reduced to between 215° C. and 225° C. Furthermore, the resin component having the second melting point (high melting point) is used to provide physical properties (e.g., a mechanical strength) required for the spinning operation.

In the spinning operation, the resin component having the first melting point (low melting point) melts and softens first, and the resin component having the first melting point (low melting point) further facilitates the resin component having the second melting point (high melting point) to melt and soften. The resin component having the first melting point (low melting point) can effectively reduce the heat of fusion (also referred to as heat of dissolution) required for the thermoplastic polyurethane resin during the spinning operation. It is worth mentioning that the heat of fusion required for spinning thermoplastic polyurethane resins is conventionally 40 joules/gram to 50 joules/gram. The heat of fusion (an enthalpy) required for spinning the thermoplastic polyurethane resin of the present embodiment can be reduced to between 15 joules/gram and 25 joules/gram (as shown in FIG. 1, the enthalpy is 18.2 joules/gram).

By virtue of the number average molecular weights of the first polyol and the second polyol and by virtue of the percentages of heat of fusion of the resin component having the first melting point and the resin component having the second melting point respectively in the overall resin, the machine processing temperature required for the thermoplastic polyurethane resin (TPU resin) of the present embodiment in the spinning operation can be reduced. Furthermore, the spinning product formed by the thermoplastic polyurethane resin of the present embodiment through the spinning operation can be easily cooled down and shaped, and is easy to be wound up. In addition, a low processing temperature can prevent the thermoplastic polyurethane resin from excessive melting and prevent a viscosity thereof from becoming too low. Accordingly, problems such as filament breakage, yarn floating, and uneven thickness can be improved.

If a range of the first number average molecular weight of the first polyol is designed to be too low (i.e., lower than 1,000 g/mol) or a range of the first melting point Tm1 is designed to be too low (i.e., lower than 170° C.), the spinning product formed by the thermoplastic polyurethane resin through the spinning operation cannot be easily cooled down and shaped, so that the spinning product fails to be easily wound up. Conversely, if the range of the first number average molecular weight of the first polyol is too high (i.e., higher than 1,500 g/mol) or the range of the first melting point Tm1 is too high (i.e., higher than 185° C.), the difference between the two melting points of the thermoplastic polyurethane resin will become insignificant, which will not help reduce the machine processing temperature required in the spinning operation.

If an amount of the resin component having the first melting point (low melting point) in the overall resin is too low (i.e., lower than 20%), the machine processing temperature required in the spinning operation cannot be effectively reduced. If the amount of the resin component having the first melting point (low melting point) in the overall resin is too high (i.e., higher than 45%), the physical properties of the thermoplastic polyurethane resin required in the spinning operation will become insufficient.

Further, the chain terminator component is a monohydric alcohol having a boiling point between 210° C. and 344° C. For example, the chain terminator component is at least one material selected from the group consisting of: arachidyl alcohol, stearyl alcohol, and palmitol. The above-mentioned chain terminator components are particularly suitable for use in the melt spinning process.

The purpose of adding the chain terminator component is to terminate the polymerization reaction after the thermoplastic polyurethane resin reaches a predetermined molecular weight in the polymerization reaction, so as to complete the reaction. Therefore, the molecular weight of the thermoplastic polyurethane resin can be maintained in a stable state, and a molecular weight distribution of the thermoplastic polyurethane resin can become more concentrated. Furthermore, since the molecular weight of the thermoplastic polyurethane resin can be maintained in a stable state and be prevented from continuously increasing, the thermoplastic polyurethane resin is less likely to have coarse particles or crystal points.

It is worth mentioning that, in the present embodiment, both the first polyol and the second polyol are polyester polyols. The thermoplastic polyurethane resin synthesized by using the polyester polyols as the raw material can have an improved tensile strength and an improved heat resistance, and the thermoplastic polyurethane resin is not easily deformed.

If other types of polyols are used, the thermoplastic polyurethane resin may be less suitable for the melt spinning process. For example, if a polyether polyol is used, the heat resistance and the physical properties of the thermoplastic polyurethane resin will be deteriorated, and the thermoplastic polyurethane resin becomes unsuitable for the melt spinning process. If a polycarbonate polyol is used, production costs of the thermoplastic polyurethane resin will be high, crystallization can easily occur, and a tactile sensation of the material will be hard.

In some embodiments of the present disclosure, an ultraviolet absorber (UV absorber) is added to the thermoplastic polyurethane resin, so that QUV (tested by ASTM G154) of the thermoplastic polyurethane resin can reach level four or higher. The ultraviolet absorber is at least one material selected from the group consisting of: benzotriazoles, benzophenones, and triazines, but the present disclosure is not limited thereto. An added amount of the ultraviolet absorber is between 0.1 wt. % and 1.0 wt. % in the thermoplastic polyurethane resin. The ultraviolet absorber is metered in a latter part of a reaction extruder, so as to reduce cracking of the material and failure of an ultraviolet absorption function during an extrusion process. As such, essentially, the ultraviolet absorber does not participate in the polymerization reaction. That is, the UV absorber is only physically mixed in the thermoplastic polyurethane resin.

Further, to enable the thermoplastic polyurethane resin of the present embodiment to be more suitable for the melt spinning process and the spinning operation, the thermoplastic polyurethane resin has the following physical properties.

A melt flow index (MI) of the thermoplastic polyurethane resin is between 10 and 25 g/10 min (215° C.), and is preferably between 15 and 20 g/10 min (215° C.).

The "melt index" mentioned in the present disclosure refers to a weight of the thermoplastic polyurethane resin when passing through a standard die every 10 minutes on a melt flow velocimeter at a temperature of 215° C., and the unit is g/10 min (215° C.). The melt index indicates the fluidity of the resin in a molten state. The larger the melt index, the smaller the molecular weight and the better the fluidity.

A ratio (Mw/Mn) between a weight average molecular weight (Mw) and a number average molecular weight (Mn) of the thermoplastic polyurethane resin analyzed by a gel permeation chromatograph (GPC) is between 1.450 and 1.550. The ratio (Mw/Mn) between the weight average molecular weight (Mw) and the number average molecular weight (Mn) is one type of a polydispersity index.

Figure 2:
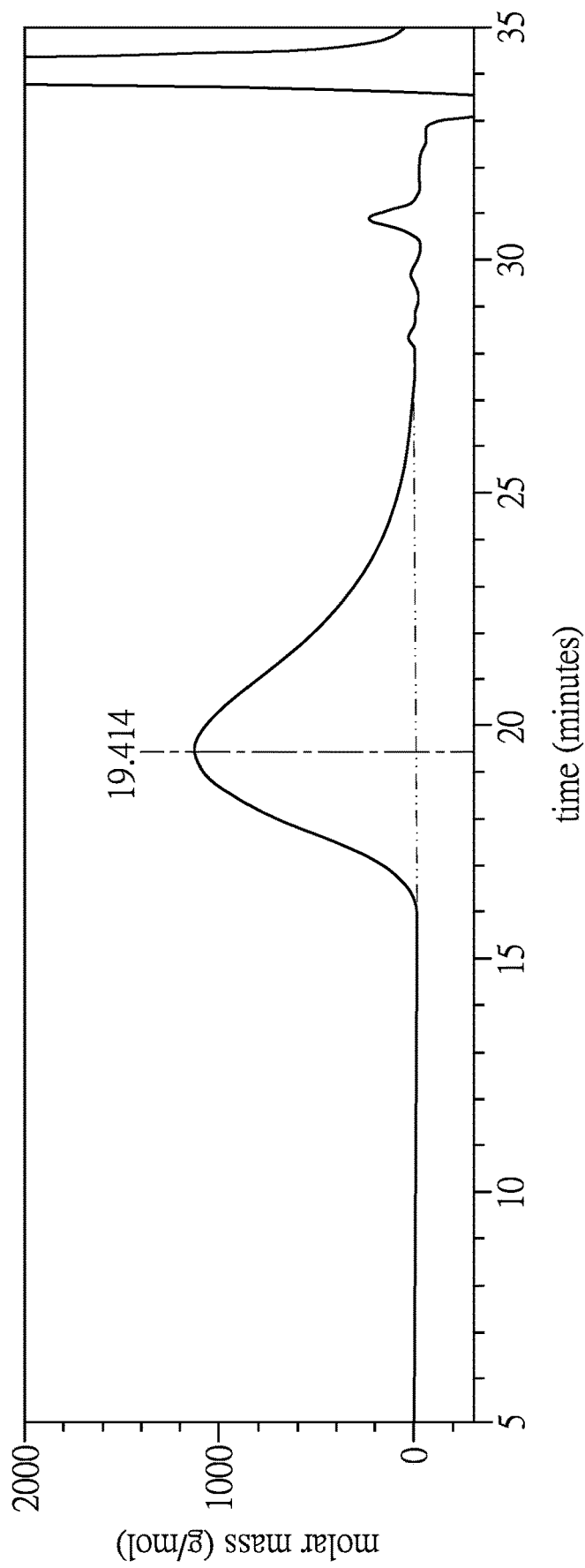
FIG. 2 is a test result of gel permeation chromatography (GPC) of the thermoplastic polyurethane resin according to the embodiment of the present disclosure.

More specifically, reference is made to FIG. 2, which illustrates a test result of gel permeation chromatography (GPC) of the thermoplastic polyurethane resin according to the present embodiment. It can be observed from peak information of the GPC analysis that there is a very high peak at about 18 to 20 minutes. In this GPC analysis, the thermoplastic polyurethane resin has a number average molecular weight (Mn) of approximately 47,000 to 53,000 g/mol, and has a weight average molecular weight (Mw) of approximately 72,000 to 78,000 g/mol. The ratio (Mw/Mn) between the weight average molecular weight (Mw) and the number average molecular weight (Mn) is between 1.450 and 1.550, and is preferably between 1.470 and 1.530.

From the perspective of a polymer structure, a polymer chain of the thermoplastic polyurethane resin includes at least one low melting point segment and at least one high melting point segment that are randomly distributed. The low melting point segment is formed by residues of a first polyol apart from hydroxyl groups. The high melting point segment is formed by residues of a second polyol apart from hydroxyl groups. The first polyol has a first number average molecular weight. The second polyol has a second number average molecular weight. The first number average molecular weight is less than the second number average molecular weight. The first number average molecular weight of the first polyol is between 1,000 grams per mole (g/mol) and 1,500 grams per mole. The second number average molecular weight of the second polyol is between 2,500 g/mol and 3,000 g/mol. A difference between the first number average molecular weight and the second number average molecular weight is not less than 1,000 g/mol. The thermoplastic polyurethane resin has a first melting point and a second melting point. The low melting point segment formed by the first polyol through the polymerization reaction correspondingly has the first melting point. The high melting point segment formed by the second polyol through the polymerization reaction correspondingly has the second melting point. The first melting point is between 170° C. and 185° C. The second melting point is between 195° C. and 210° C. In addition, the low melting point segment having the first melting point accounts for 20% to 45% of the whole resin. The high melting point segment having the second melting point accounts for 55% to 80% of the whole resin. The unit of the above % is the percentage of heat of fusion.

Method for Producing Thermoplastic Polyurethane Resin

The description above is related to the material characteristics of the thermoplastic polyurethane resin of the present embodiment, and a method for producing the thermoplastic polyurethane resin of the present embodiment will be described below.

The method for producing the thermoplastic polyurethane resin includes a mixing stage and a reaction stage.

The mixing stage includes: using a separate meter to stably introduce the isocyanate component and the polyol component (including the first polyol and the second polyol) into a mixer according to the above-described metering in the present embodiment for premixing, so as to form a reaction mixture.

The reaction stage includes: introducing the reaction mixture including the isocyanate component and the polyol component into a twin-screw reaction extruder, so that the isocyanate component and the polyol component undergo a polymerization reaction; and introducing a chain terminator component after reactive extrusion, so as to terminate the polymerization reaction and finally form the thermoplastic polyurethane resin.

An extrusion temperature of the twin-screw reaction extruder is preferably set between 150° C. and 250° C., so that the polymerization reaction can be fully performed, but the present disclosure is not limited thereto. Furthermore, after the reactive extrusion step is completed, the thermoplastic polyurethane resin is pelletized in an aqueous environment to form a colloidal TPU resin.

In some embodiments of the present disclosure, a viscosity on an auxiliary line is monitored in real time in the method for producing the thermoplastic polyurethane resin, and a pouring amount of a raw material is fed back according to a monitored viscosity value, so as to improve a pouring accuracy of the raw material. In addition, an NCO/OH equivalent ratio is instantly controlled to fall within a predetermined range, such that a TPU resin with a stable melt index change rate within a batch can be produced. More specifically, after the reaction mixture comes out of the separate meter, an instant viscosity can be detected by an in-line viscometer. When the viscosity exceeds a control range, a metered amount of the raw material is adjusted, and the viscosity is corrected to ensure stable production.

In addition, the NCO/OH equivalent ratio of the reaction mixture in the polymerization reaction is preferably controlled between 0.98 and 1.02, and is more preferably controlled between 0.995 and 1.005, but the present disclosure is not limited thereto.

Beneficial Effects of the Embodiments

In conclusion, in the thermoplastic polyurethane resin suitable for melt spinning provided by the present disclosure, by virtue of "the polyol component includes a first polyol and a second polyol, the first polyol has a first number average molecular weight, the second polyol has a second number average molecular weight, the first number average molecular weight is between 1,000 and 1,500 g/mol, and the second number average molecular weight is between 2,500 and 3,000 g/mol" and "in the thermoplastic polyurethane resin, a resin component formed by the first polyol and the isocyanate component through the polymerization reaction is defined as a low melting point segment and correspondingly has a first melting point, another resin component formed by the second polyol and the isocyanate component through the polymerization reaction is defined as a high melting point segment and correspondingly has a second melting point; the first melting point is between 170° C. and 185° C., the second melting point is between 195° C. and 210° C., and a difference between the first melting point and the second melting point is not less than 15° C." and "the low melting point segment has a percentage of heat of fusion ranging from 20% to 45%, and the high melting point segment has a percentage of heat of fusion ranging from 55% to 80%", a machine processing temperature required for the thermoplastic polyurethane resin (TPU resin) in a spinning operation can be reduced.

Furthermore, a spinning product formed by a spinning operation of the present disclosure is easy to be cooled and shaped, and easy to be wound. The low processing temperature can prevent the thermoplastic polyurethane resin from excessively melting and the viscosity becoming too low. Accordingly, the problems of broken wires, floating wires, and uneven thickness can be improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A thermoplastic polyurethane resin suitable for melt spinning, characterized in that the thermoplastic polyurethane resin is formed from a reaction mixture via a polymerization reaction, and the reaction mixture includes:
   an isocyanate component; and
   a polyol component, wherein the polyol component includes a first polyol and a second polyol, the first polyol has a first number average molecular weight, the second polyol has a second number average molecular weight, the first number average molecular weight is between 1,000 g/mol and 1,500 g/mol, and the second number average molecular weight is between 2,500 g/mol and 3,000 g/mol;
   wherein, in the thermoplastic polyurethane resin, one resin component formed by the first polyol and the isocyanate component through the polymerization reaction is defined as a low melting point segment and correspondingly has a first melting point, and another resin component formed by the second polyol and the isocyanate component through the polymerization reaction is defined as a high melting point segment and correspondingly has a second melting point; wherein the first melting point is between 170° C. and 185° C., the second melting point is between 195° C. and 210° C., and a difference between the first melting point and the second melting point is not less than 15° C.;
   wherein the low melting point segment has a percentage of heat of fusion ranging from 20% to 45%, and the high melting point segment has a percentage of heat of fusion ranging from 55% to 80%.

2. The thermoplastic polyurethane resin according to claim 1, wherein the first melting point is between 175° C. and 180° C., the second melting point is between 200° C. and 205° C., and the difference between the first melting point and the second melting point is not less than 20° C.

3. The thermoplastic polyurethane resin according to claim 1, wherein, in the thermoplastic polyurethane resin, the percentage of heat of fusion of the low melting point segment is between 30% and 40%, and the percentage of heat of fusion of the high melting point segment is between 60% and 70%.

4. The thermoplastic polyurethane resin according to claim 1, wherein the first polyol is a first polyester polyol, and is at least one material selected from the group consisting of: poly(1,4-butylene adipate), polyethylene-1,4-butylene adipate glycol, and poly(1,6-hexamethylene adipate-succinic acid); wherein the second polyol is a second polyester polyol, and is at least one material selected from the group consisting of: poly(1,4-butylene adipate), polyethylene-1,4-butylene adipate glycol, and poly(1,6-hexamethylene adipate-succinic acid).

5. The thermoplastic polyurethane resin according to claim 1, wherein, when the thermoplastic polyurethane resin is melt-spun, the low melting point segment is first to melt and soften, and the low melting point segment then facilitates the high melting point segment to melt and soften; wherein the low melting point segment reduces a heat of fusion of the thermoplastic polyurethane resin, and the heat of fusion of the thermoplastic polyurethane resin is between 15 joules/gram and 25 joules/gram.

6. The thermoplastic polyurethane resin according to claim 1, wherein the reaction mixture further includes a chain terminator component, and the chain terminator component is a monohydric alcohol having a boiling point between 210° C. and 344° C.

7. The thermoplastic polyurethane resin according to claim 1, wherein the thermoplastic polyurethane resin is additionally added with an ultraviolet absorber, and the ultraviolet absorber is at least one material selected from the group consisting of benzotriazoles, benzophenones, and triazines.

8. The thermoplastic polyurethane resin according to claim 1, wherein a melt flow index (MFI) of the thermoplastic polyurethane resin is between 10 and 25 g/10 min (215° C.), and a ratio (Mw/Mn) between a weight average molecular weight (Mw) and a number average molecular weight (Mn) of the thermoplastic polyurethane resin analyzed by a gel permeation chromatograph (GPC) is between 1.450 and 1.550.

9. The thermoplastic polyurethane resin according to claim 1, wherein, based on a total weight of the reaction mixture being 100 parts by weight, an amount of the isocyanate component is between 45 parts by weight and 50 parts by weight, and an amount of the polyol component is between 35 parts by weight and 40 parts by weight; wherein a weight ratio between the first polyol and the second polyol ranges from 12:24 to 8:26.

10. A thermoplastic polyurethane resin suitable for melt spinning, characterized in that a polymer chain of the thermoplastic polyurethane resin includes at least one low melting point segment and at least one high melting point segment;
    wherein the at least one low melting point segment is formed by a first polyol and an isocyanate component through a polymerization reaction, and the at least one high melting point segment is formed by a second polyol and the isocyanate component through the polymerization reaction;
    wherein the first polyol has a first number average molecular weight, the second polyol has a second number average molecular weight, the first number average molecular weight is between 1,000 and 1,500 g/mol, and the second number average molecular weight is between 2,500 and 3,000 g/mol;
    wherein the at least one low melting point segment correspondingly has a first melting point, the at least one high melting point segment correspondingly has a second melting point, the first melting point is between 170° C. and 185° C., the second melting point is between 195° C. and 210° C., and a difference between the first melting point and the second melting point is not less than 15° C.; wherein a percentage of heat of fusion of the at least one low melting point segment is between 20% and 45%, and a percentage of heat of fusion of the at least one high melting point segment is between 55% and 80%.

11. The thermoplastic polyurethane resin according to claim 10, wherein, in the thermoplastic polyurethane resin, the percentage of heat of fusion of the at least one low melting point segment is between 30% and 40%, and the percentage of heat of fusion of the at least one high melting point segment is between 60% and 70%.

* * * * *